(12) United States Patent
Asakawa (10) Patent No.: US 6,634,757 B2
(45) Date of Patent: Oct. 21, 2003

(54) PROJECTION DISPLAY APPARATUS (75) Inventor: Katsumi Asakawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/951,543

(22) Filed: Sep. 14, 2001

(65) Prior Publication Data

US 2002/0118341 A1 Aug. 29, 2002

(30) Foreign Application Priority Data

Feb. 27, 2001 (JP) ........................ 2001/051773

(51) Int. Cl.[7] ................ G03B 21/20; G03B 21/00
(52) U.S. Cl. ............................. 353/85; 353/122
(58) Field of Search ....................... 353/85, 86, 121, 353/122, 34, 29, 31

(56) References Cited

U.S. PATENT DOCUMENTS

| | | | | |
|---|---|---|---|---|
| 3,571,493 A | * | 3/1971 | Baker et al. | 353/85 |
| 5,537,168 A | * | 7/1996 | Kitagishi et al. | 353/101 |
| 5,658,062 A | * | 8/1997 | Lee et al. | 353/101 |
| 6,177,915 B1 | * | 1/2001 | Beeteson et al. | 345/87 |
| 6,278,382 B1 | * | 8/2001 | DeMarco et al. | 315/65 |
| 6,409,350 B1 | * | 6/2002 | Kakimoto et al. | 353/85 |

OTHER PUBLICATIONS

Merriam–Webster's Collegiate Dictionary, 2001, Meriam--Webster, 10th eddition, page 691.*

* cited by examiner

*Primary Examiner*—Russell Adams
*Assistant Examiner*—Andrew Sever
(74) *Attorney, Agent, or Firm*—Birch, Stewart, Kolasch & Birch, LLP (57) ABSTRACT

A projection display apparatus with a light source, a light valve and an optical system for projecting an image formed in an image-forming plane of the light valve onto a screen is disclosed. The projection display apparatus includes a first processor for calculating an area of an image projected onto the screen, a photometer for measuring illuminance in the neighborhood of the image projected onto the screen, a second processor for calculating a black-level correction value from the area of the image calculated by the first processor and the illuminance measured by the photometer, and a light-source-power controller for controlling power supplied to the light source on the basis of the black-level correction value calculated by the second processor.

7 Claims, 13 Drawing Sheets

PROJECTION DISPLAY APPARATUS

FIELD OF THE INVENTION

The present invention relates to a projection display apparatus.

BACKGROUND OF THE INVENTION

Figure 12:
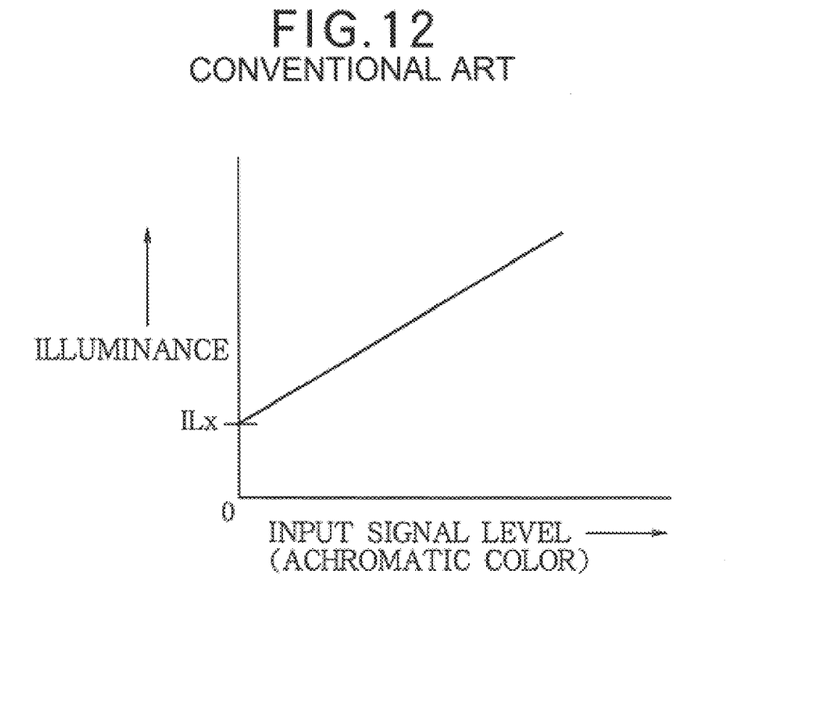
FIG. 12 is a view showing a relationship between illuminance of a projected image and a level of an input signal in a dark room isolated from the ambient light.

FIG. 12 shows a typical relationship between illuminance of a projected image and a level of an input signal (achromatic color) in a projection display apparatus used in a dark room isolated from the ambient light. In this figure, ILx denotes illuminance of apart of a screen at black level (achromatic color, input signal level: zero). Even when a signal input to the projection display apparatus is at a zero level, ILx does not become zero, since an LCD panel used as a light valve in the projection display apparatus cannot block the light completely.

Figure 13:
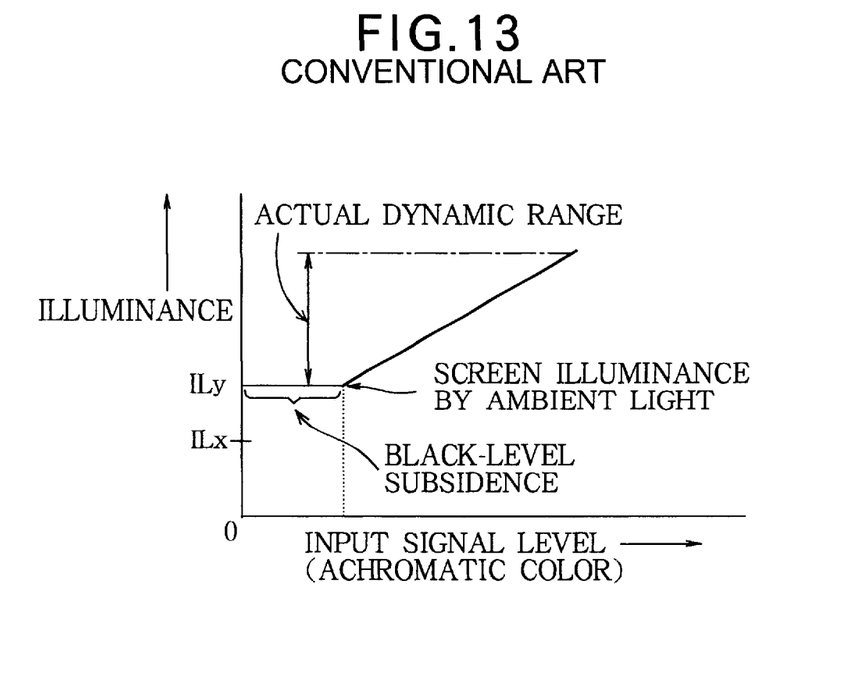
FIG. 13 is a view showing a relationship between illuminance of a projected image and a level of an input signal in a well-lit environment where the ambient light falls on a screen.

When the projection display apparatus is used not in a dark room but in an environment where the ambient light falls on the screen (when the room is lit so that viewers can take notes in a presentation, for example), illuminance ILy of the screen due to the ambient light disables parts of the screen at levels which are below ILy and close to a black level from being reproduced (referred to as "black-level subsidence" hereinafter), thereby narrowing a dynamic range as shown in FIG. 13. On the other hand, when the projection display apparatus is used in a dark environment where illuminance ILz of the screen due to the ambient light is lower than ILx, a black level is undesirably higher than ILz by ILx−ILz (referred to as "black-level rise" hereinafter)

Figure 15:
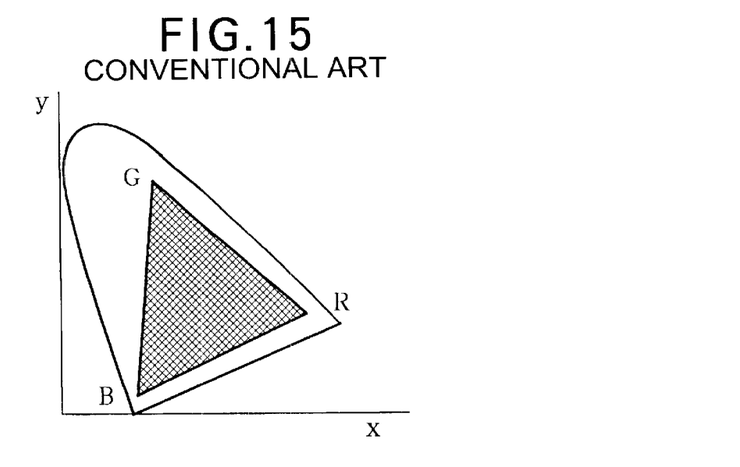
FIG. 15 is a view showing a color-reproducible range of a projected image in a dark room isolated from the ambient light.
Figure 16:
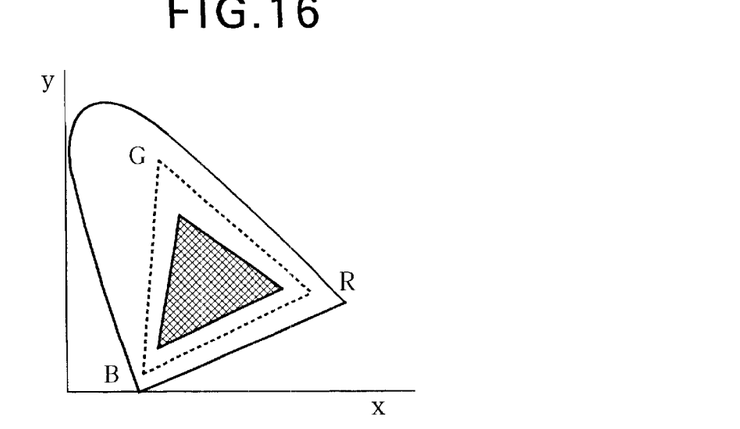
FIG. 16 is a view for explaining narrowing of the color-reproducible range of the projected image in a well-lit environment where the ambient light falls on the screen.

Furthermore, when a color-reproducible range of a projected image in a dark room isolated from the ambient light is as shown by a crosshatched portion of FIG. 15 which represents an x-y chromaticity diagram of the CIE XYZ color system, if white ambient light is applied to the projected image, the color-reproducible range is narrowed as shown in FIG. 16. When tinted light is used instead of white light for lighting, not only the color-reproducible range is narrowed, but also its shape is changed.

OBJECT AND SUMMARY OF THE INVENTION

Generally, the projection display apparatus is provided with facilities of brightness adjustment and contrast adjustment, so that the user can adjust brightness and contrast viewing an image projected onto the screen. However, these facilities cannot fully accommodate the above-described black-level rise, black-level subsidence, narrowing of the dynamic range and deterioration of color-reproduction characteristic. Besides, since adjustment of brightness or contrast is achieved by arithmetic operation on video signals which are generally converted into digital signals, when a digital video signal is formed from 8 bits, unless the bit length is extended sufficiently during the arithmetic operation temporarily, to 10 bits for instance, the dynamic range can be narrowed due to accumulation of calculation errors. This accumulation of calculation errors can also cause the projected image to exhibit false contours.

The present invention has been made to solve the above-described problems with an object of improving the black-level reproduction characteristic, the dynamic range, and the color reproduction characteristic of an projected image.

The above-described object of the invention can be achieved by a projection display apparatus in which a light emitted from a light source enters a light valve, an image corresponding to an input video signal is formed in an image-forming plane of the light valve, and the formed image is projected onto a screen through an optical system, the projection display apparatus comprising:

a first processor for calculating an area of an image projected onto the screen;

a photometer for measuring illuminance in the neighborhood of the image projected onto the screen;

a second processor for calculating a black-level correction value from the area of the image calculated by the first processor and the illuminance measured by the photometer; and a light-source-power controller for controlling power supplied to the light source on the basis of the black-level correction value calculated by the second processor.

The projection display apparatus may further comprise a distance-measuring device for automatically measuring a distance between the projection display apparatus and the screen, the first processor automatically calculating the area of the image projected onto the screen on the basis of a target position of a zoomlens included in a projection lens unit of the optical system and the distance measured by the distance-measuring device.

The projection display apparatus may further comprise a first timer which is reset when the power supplied to the light source is changed by the light-source-power controller and starts to measure a time elapsed after reset of the first timer, the light-source-power controller keeping the power supplied to the light source constant until a count value of the first timer reaches a predetermined value.

The projection display apparatus may further comprise a first memory which samples the illuminance measured by the photometer at regular time intervals and stores resultant samples in succession, and a third processor for calculating an average of the samples stored in the first memory, the second processor calculating the black-level correction value on the basis of the average of the samples supplied from the third processor.

The light-source-power controller may keep the power supplied to the light source constant irrespective of the illuminance measured by the photometer until a predetermined time elapses after light up of the light source.

The projection display apparatus may further comprise a fourth processor which, when the illuminance in the neighborhood of the projected image measured by the photometer is higher than a maximum black level obtainable through control by the light-source-power controller, corrects an input video signal in order to adjust brightness and contrast of the projected image by a value corresponding to a difference between the illuminance in the neighborhood of the projected image and the maximum black level.

The light source may include a discharge tube whose tube voltage varies with increase of a cumulative lighting time thereof, and the projection display apparatus may further comprise a second timer for measuring the cumulative lighting time of the light source, and a second memory storing a characteristic of variation of the tube voltage with the increase of the cumulative lighting time of the light source, the light-source-power controller compensating for variation of the power supplied to the light source due to the variation of the tube voltage on the basis of the cumulative lighting time supplied from the second timer and the characteristic of the variation of the tube voltage supplied from the second memory.

The above-described object of the invention can be also achieved by a projection display apparatus in which a light emitted from a light source enters a light valve, an image corresponding to an input video signal is formed in an image-forming plane of the light valve, and the formed image is projected onto a screen through an optical system, the projection display apparatus comprising:

a light-source-power controller for controlling power supplied to the light source on the basis of a black-level correction value supplied from outside;

a signal generator for generating a testing video signal used for projecting a test image including a plurality of regions disposed in order of brightness; and an adjuster allowing adjustment to the black-level correction value supplied to the light source with the test image being projected onto the screen.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
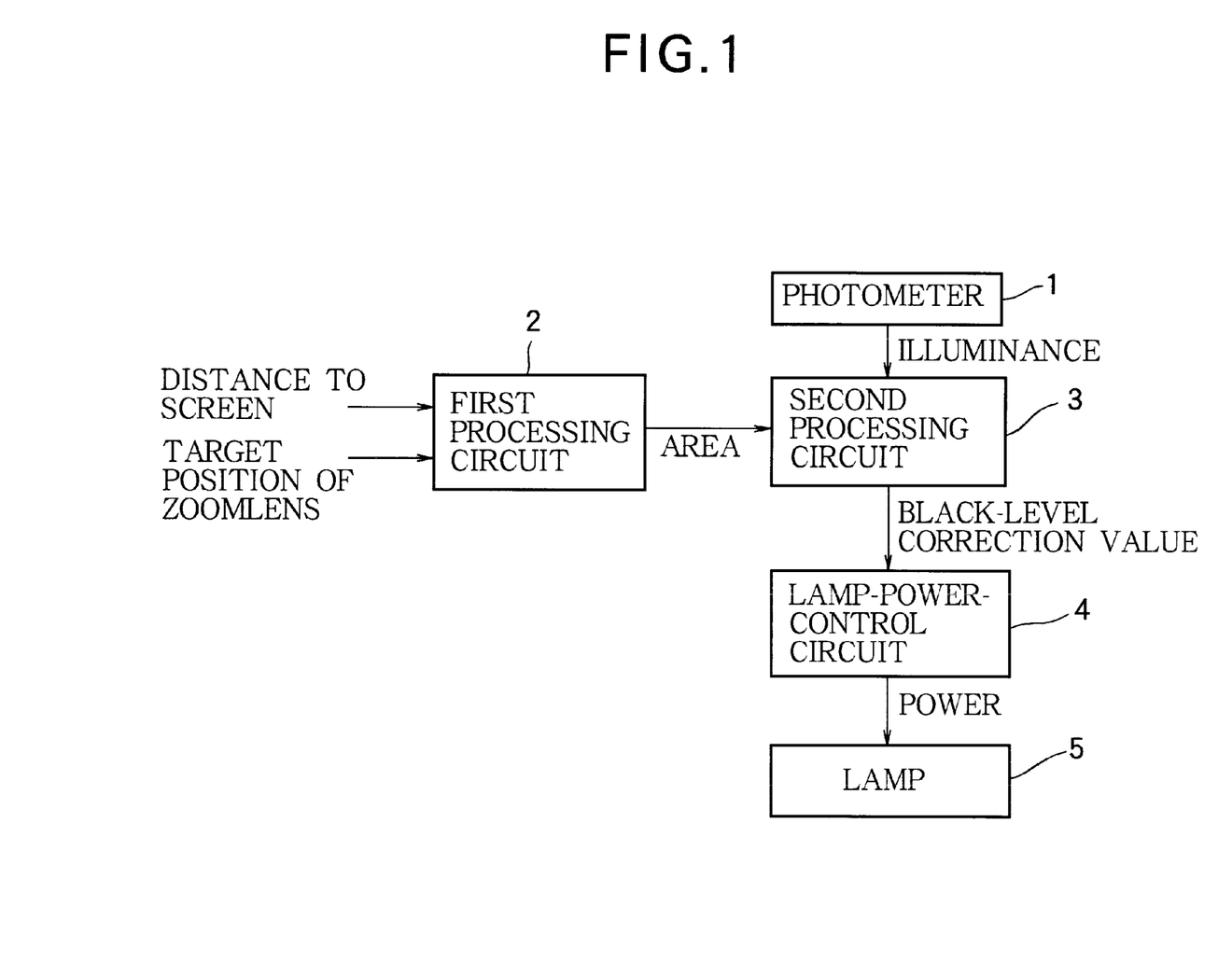
FIG. 1 is a block diagram showing a structure of a first example of the projection display apparatus according to the invention.

FIG. 1 is a block diagram showing a structure of a first example of a projection display apparatus according to the invention. In this figure, 1 denotes a photometer, 2 denotes a first processing circuit, 3 denotes a second processing circuit, 4 denotes a light-source-power control circuit, and 5 denotes a light source. The photometer 1 is installed in a place suitable for measuring illuminance due to the ambient light falling on a screen. The operation of the first example will be explained below.

First, an area of an image projected onto the screen is determined. The area can be determined, for example, by automatically detecting the position of a zoomlens driven by a stepping motor on the basis of revolution of the steeping motor after the user inputs the distance between the projection display apparatus and the screen to the projection display apparatus. The area of the image is determined uniquely as a function f of the target position of the zoomlens and the distance to the screen in accordance with the following expression (1) for a given optical system of the projection display apparatus.

$$S=f(zx,d) \tag{1}$$

S: Area of the projected image.

zx: Target position of the zoomlens.

d: Distance to the screen.

If the function f of the expression (1) is simple, the first processing circuit 2 can perform the calculation. If the function f is complicated, it is preferable to use a memory that stores output S for each of different combinations of zx and d. It is also possible to store output S for only a limited number of combinations of zx and d and calculate the area by linear interpolation in order to reduce the capacity of the memory.

The following expression (2) shows relationship among the area S of the projected image, a luminous flux L outgoing from a lamp 5 of the light source and passing a projection lens, and an illuminance IL of the projected image. As is evident from the expression (2), the illuminance IL of the projected image is inversely proportional to the area S of the projected image.

$$IL=L/S \tag{2}$$

If the area of the projected image calculated by the first processing circuit 2 is Sa, and the luminous flux passing the projection lens is La (W) in a fully black state of the screen (input signal level: 0, white: 0%) when the lamp power is W, the second processing circuit 3 calculates the illuminance ILa of the projected image in accordance with the following expression (3). The value of La (W) is prestored in the second processing circuit 3.

$$ILa=La(W)/Sa \qquad (3)$$

When the illuminance of a part of the screen close to the projected image due to the ambient light is measured at ILb by the photometer 1, one of the relationships (a), (b) and (c) described below exists between ILb and ILa.

(a) ILa=ILb: The black level of the projected image is proper.
(b) ILa>ILb: The black level of the projected image is too high in a dark environment such as a dark room where the screen is applied with almost no ambient light.
(c) ILa<ILb: The black level of the projected image is too low in a well-lit environment where the screen is applied with bright ambient light.

The second processing circuit 3 outputs a black-level correction value BLoffset for each case of (a), (b), and (c) in accordance with the following expressions (4), (5), and (6).

(a) ILa=ILb $$BLoffset=ILb-ILa=0 \qquad (4)$$

The black level is proper, and no correction should be made (the black-level correction value is set to zero).

(b) ILa>ILb $$BLoffset=ILb-ILa< \qquad (5)$$

The black-level correction value BLoffset for effecting reduction in the power supplied to the lamp 5 or in the amount of light from the lamp 5 is output to the lamp power control circuit 4.

(c) ILa<ILb $$BLoffset=ILb-ILa>0 \qquad (6)$$

The black-level correction value BLoffset for effecting increase in the power supplied to the lamp 5 or in the amount of light from the lamp 5 is output to the lamp power control circuit 4.

The lamp power control circuit 4 changes the power supplied to the lamp 5 from W before correction to Wr that is the sum of W and the black-level correction value BLoffset. In the expression (7), k is a coefficient specific to the lamp 5. At this time, the lamp power control circuit 4 determines Wr on condition that Wr does not exceed a maximum rated power Wmax of the lamp 5 and does not drop below a minimum rated power Wmin of the lamp 5 in accordance with the following expressions (8) and (9).

$$Wr=W+k \cdot BLoffset \qquad (7)$$

$$\text{If } Wr>Wmax, \text{ then } Wr=Wmax \qquad (8)$$

$$\text{If } Wr<Wmin, \text{ then } Wr=Wmin \qquad (9)$$

Figure 17:
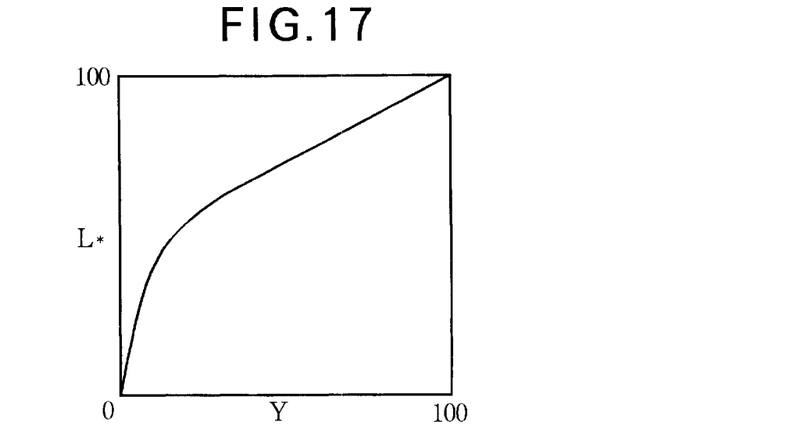
FIG. 17 is a graph showing psychological luminosity L* recommended by CIE in 1976.

According to the recommendation made by CIE in 1976, psychological luminosity L* can be expressed by the following expression (10).

$$L^*=116(Y/Y0)^{1/3}-16 \ (Y/Y0)>0.008856) \qquad (10)$$

where Y represents tristimulus values in the XYZ color system defined by CIE, and Y0 represents the values of Y in the standard white.

FIG. 17 presents the expression (10) in graphical form. From this graph, it is apparent that a human being is sensitive to lightness change in a dark part of an image, but becomes insensitive to lightness change as the lightness increases. The tristimulus values Y can be obtained from the RGB color system through linear conversion from the following expression (11).

$$Y=k1 \cdot R+k2 \cdot G+k3 \cdot B \qquad (11)$$

where k1 to k3 are coefficients. For instance, in the NTSC system, k1=0.3, k2=0.59, k3=0.11.

Figure 2:
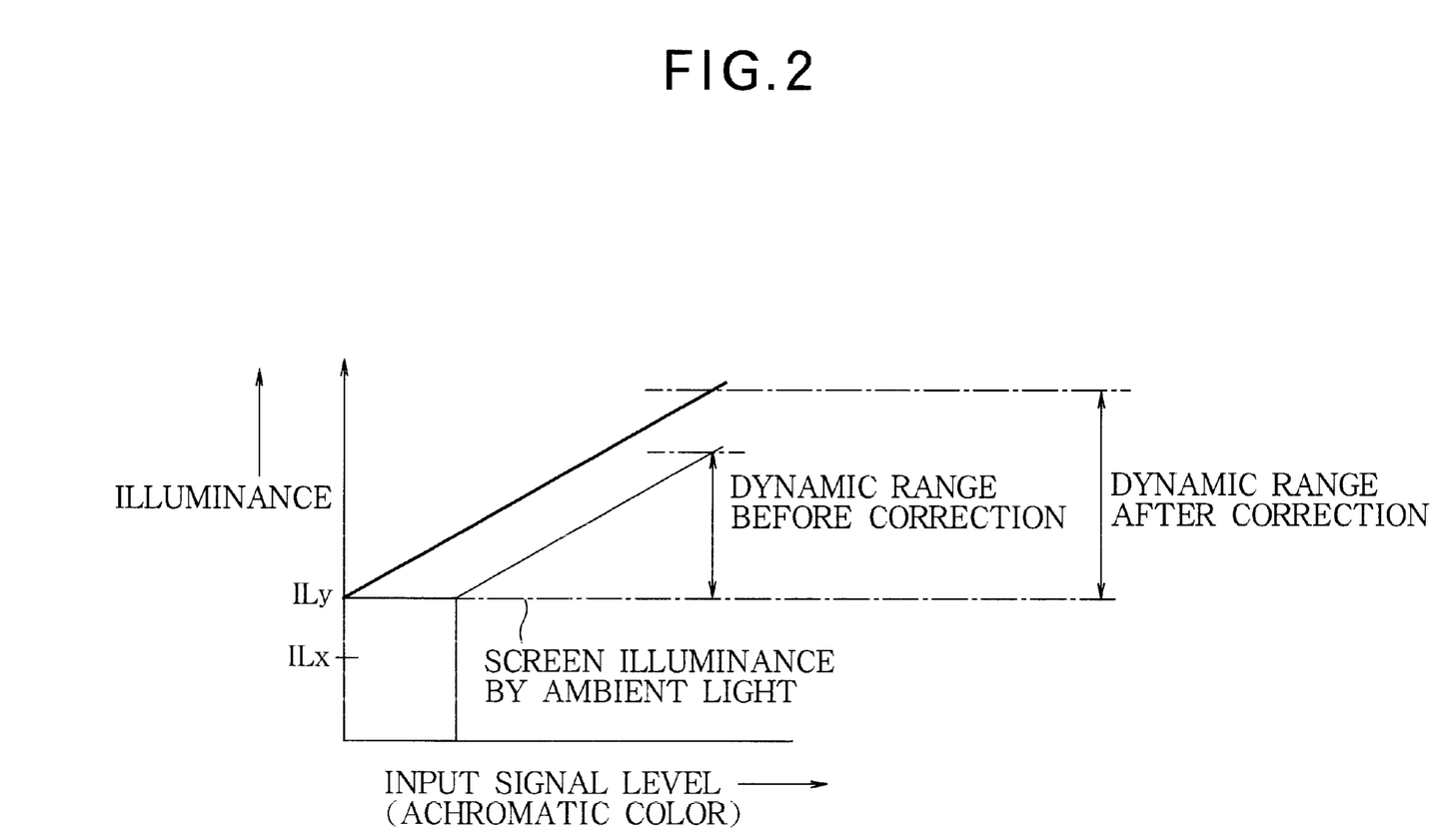
FIG. 2 is a view showing a relationship between illuminance of a projected image corrected through lamp power control and a level of an input video signal in a well-lit environment where the ambient light falls on a screen.
Figure 3:
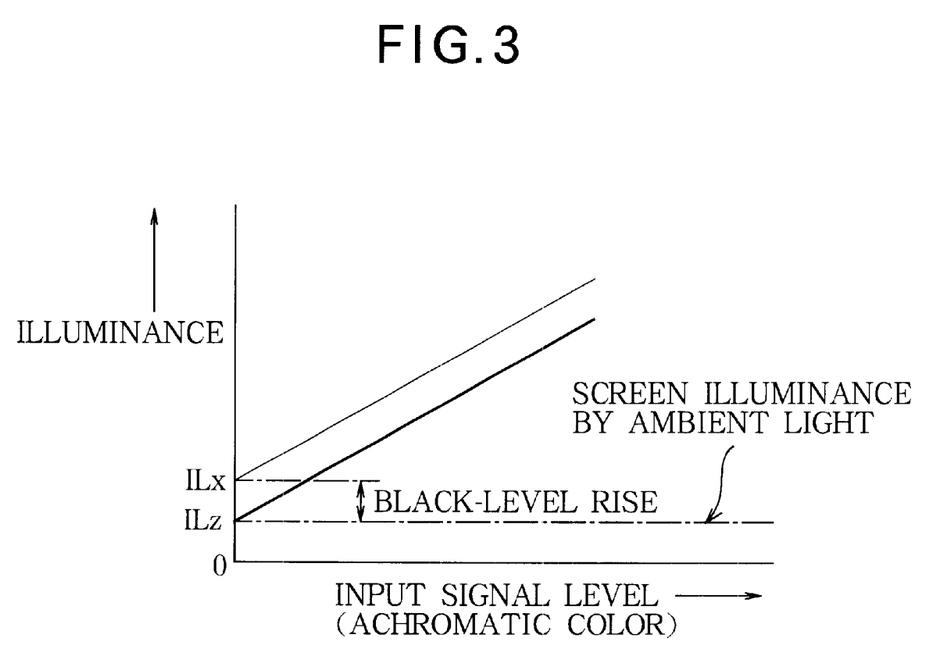
FIG. 3 is a view showing a relationship between illuminance of a projected image corrected through lamp power control and a level of an input video signal in a dark room isolated from the ambient light or a room where illuminance of the screen due to the ambient light is low.
Figure 14:
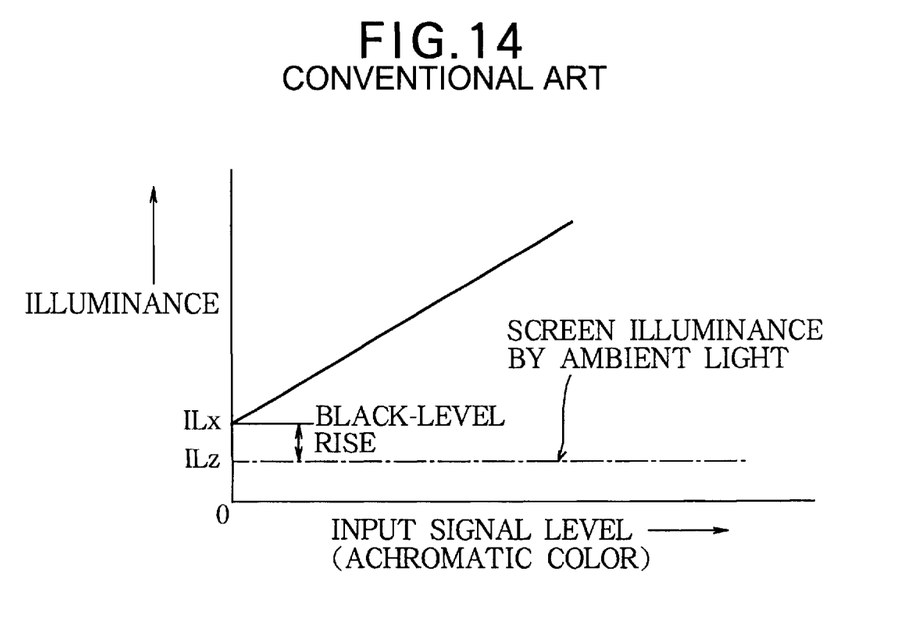
FIG. 14 is a view showing a relationship between illuminance of a projected image and a level of an input video signal in a dark room isolated from the ambient light or a room where illuminance on the screen due to the ambient light is low.

With the projection display apparatus of this example, even in a well-lit environment where the black level subsides and gradations of a low-illuminance part of a projected image are saturated, thereby reducing the dynamic range of the projected image as explained with reference to FIG. 13, it is possible to obtain a good projected image having an improved dynamic range with no black-level subsidence as shown by the bold line in FIG. 2, since the black level is corrected, which affects the lightness of the low-illumination part whose lightness change is easily perceived due to visual characteristic of a human being. In addition, since colors that have been thinned by the ambient light are improved in chroma, the narrowing of the color-reproducible range is suppressed. Furthermore, even in a dark environment such as a dark room or a dimly-lit room where luminance of the screen due to the ambient light is very low and therefore there arises the black-level rise as explained with reference to FIG. 14, it is possible to provide a good projected image in which the black level is corrected to remove the black-level rise as shown by the bold line in FIG. 3.

Although the lamp power is controlled using the linear function of the black-level correction value BLoffset in the first example, a quadratic function or a higher order function may be used to control the lamp power.

Furthermore, although the first example uses only one photometer, it is possible to install four photometers at the four corners of the screen and control the lamp power on the basis of an average illuminance.

Furthermore, although the projection display apparatus of the first example is the one that has a zoomlens and a focusing lens, the present invention is applicable to a projection display apparatus of the unifocal type that has not any zoomlens. In that case, the area of the image can be calculated from the distance d to the screen alone in accordance with the following expression (12) instead of the expression (1).

$$S=f'(d) \qquad (12)$$

In the projection display apparatus of the first example described above, the black-level correction does not require arithmetic processing on video signals since it is performed through control of the lamp power and not through brightness adjustment or contrast adjustment resulting from arithmetic processing on video signals, and therefore it is unnecessary to extend temporarily the bit length of digital video signals. Accordingly, there is no fear of narrowing the dynamic range or causing false contours to appear due to build up of calculation errors, since calculation errors do not build up unlike conventional projection display apparatuses.

Figure 4:
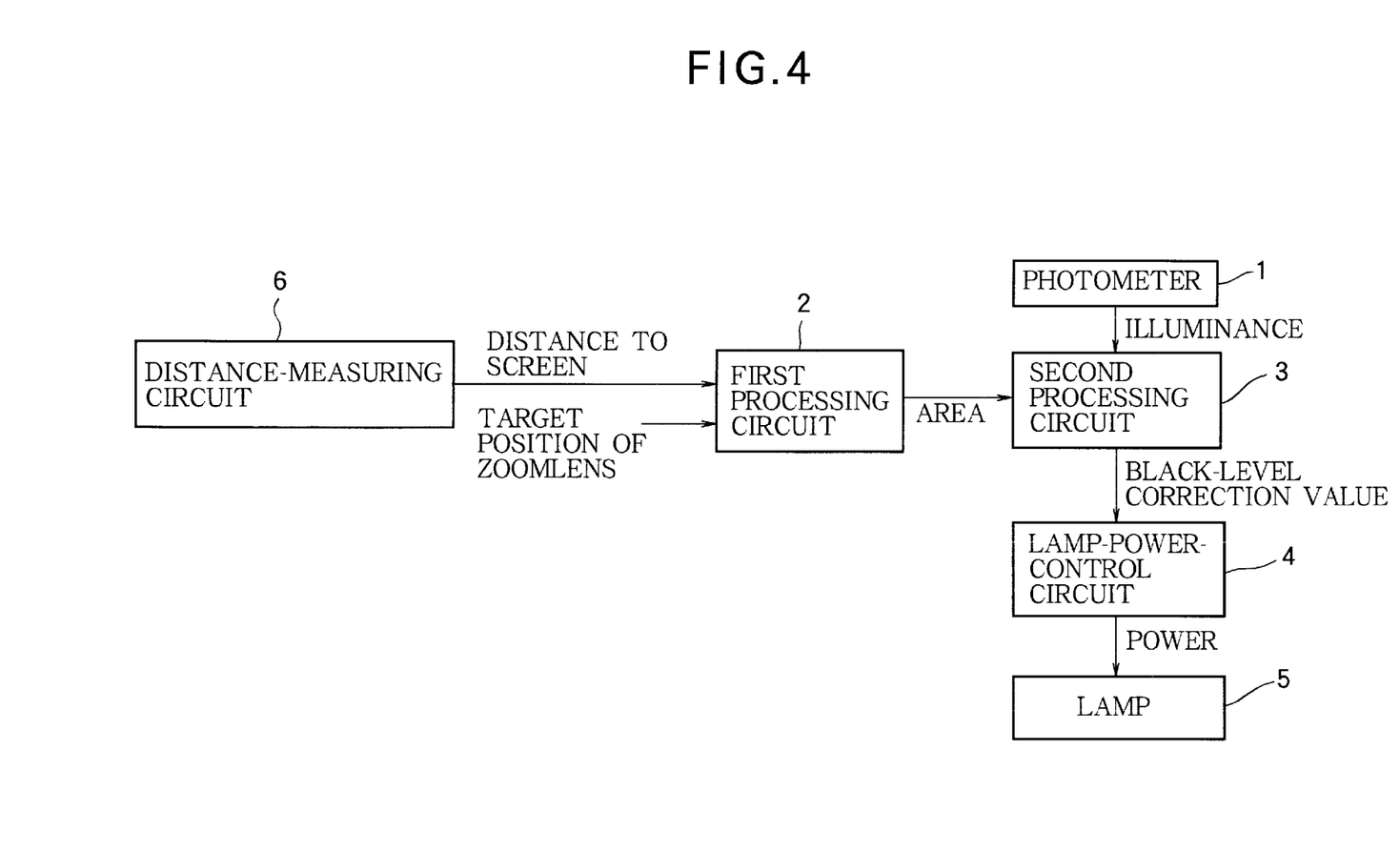
FIG. 4 is a block diagram showing a structure of a second example of the projection display apparatus according to the invention.

FIG. 4 is a block diagram showing a structure of a second example of the projection display apparatus according to the invention. In FIG. 4, the reference numerals identical to those in FIG. 1 represent the same or corresponding elements. The second example differs from the first example in that the second example has a distance-measuring circuit 6. The distance measuring circuit 6 automatically measures the distance to the screen onto which images are projected by use of infrared radiation for instance.

In the previously described first example, the distance to the screen is inputted into the projection display apparatus by the user. In the first example, the user has to input the distance into the projection display apparatus only once in a case where the vide projection display apparatus and the screen are fixed. However, in a case where the projection display apparatus is of the portable type, the user has to input the distance to the screen each time it is moved. The second example can save such trouble.

The distance-measuring circuit is not limited to the infrared radiation type, and any type, such as ultrasonic wave radiation type or electromagnetic wave radiation type can be used if it does not affect a projected image.

Figure 5:
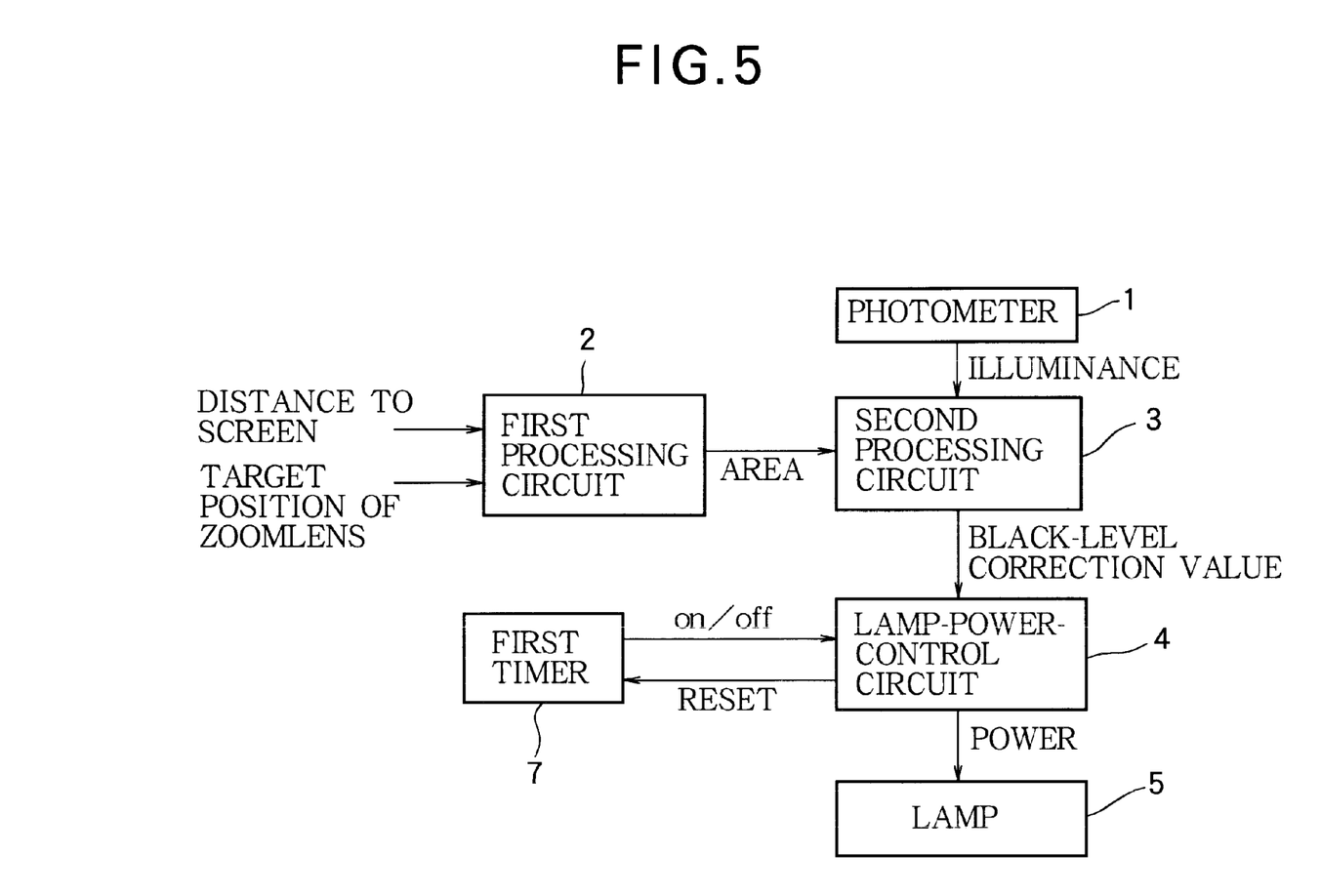
FIG. 5 is a block diagram showing a structure of a third example of the projection display apparatus according to the invention.

FIG. 5 is a block diagram showing a structure of a third example of the projection display apparatus according to the invention. In FIG. 5, the reference numerals identical to those in FIG. 1 represent the same or corresponding elements. The third example differs from the first example in that the third example has a first timer 7.

In the third example, the lamp power control circuit 4 sends a reset signal to the first timer 7 when the lamp power control circuit 4 has controlled the lamp power to a value proper for the illuminance of the screen due to the ambient light. The first timer 7 resets its count value to 0 upon receipt of the reset signal, and starts to count from 0 to a predetermined value Cctr again. The lamp power is fixed over a period of time during which the count value of the first timer 7 is smaller than the value Cctr. That is, the lamp power control circuit 4 does not control the lamp power even if the ambient light changes in intensity. This halt on the control of the lamp power is performed after the lamp 5 reaches a thermal equilibrium and enters a stable-lighting period.

With the third example, it is possible to suppress overfluctuations of the lamp power, to thereby suppress screen flickering and reduce stress on the lamp 5 when the ambient light fluctuates in intensity.

Figure 6:
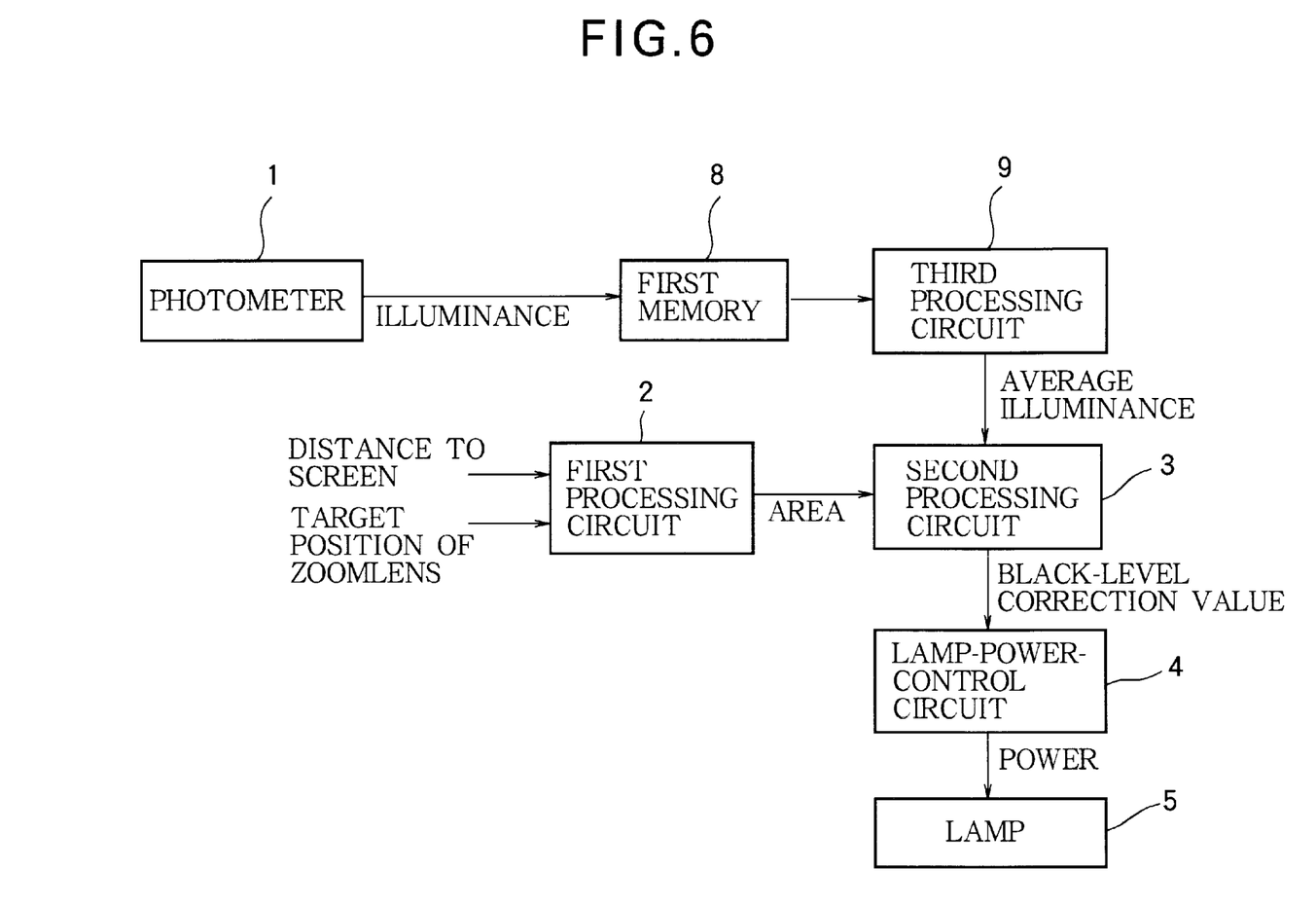
FIG. 6 is a block diagram showing a structure of a fourth example of the projection display apparatus according to the invention.

FIG. 6 is a block diagram showing a structure of a fourth example of the projection display apparatus according to the invention. In FIG. 6, the reference numerals identical to those in FIG. 1 represent the same or corresponding elements. The fourth example differs from the first example in that the fourth example has a first memory 8 and a third processing circuit 9.

The first memory 8 samples the illuminance output from the photometer 1 at regular time intervals (every t seconds) and stores resultant samples in succession. The first memory 8 is the FIFO (First In First Out) type, that stores a newly coming sample and erases the oldest sample every t seconds. Here, assume that the first memory 8 stores n samples $IL[1]$, $IL[2]$, $IL[3]$, ..., $IL[n-1]$, $IL[n]$.

The third processing circuit 9 receives the n samples from the first memory 8 and calculates an average illuminance ILav in accordance with the following expression (13).

$$ILav = \Sigma IL[i]/n \quad (13)$$

This average illuminance ILav is supplied to the second processing circuit 3. The second processing circuit 3 calculates the black-level correction value from this average illuminance ILav and the area S of the projected image supplied form the first processing circuit 2. The lamp power control circuit 4 controls the power supplied to the lamp 5 on the basis of this black-level correction value.

With the fourth example, it is possible to suppress overfluctuations of the lamp power, to thereby suppress screen flickering and reduce stress on the lamp 5 when the ambient light fluctuates in intensity. Although the fourth example uses a simple average as the average illuminance, it is possible to use a moving average in which older samples are assigned to smaller weighting factors and newer samples are assigned to larger weighting factors.

A fifth example of the projection display apparatus according to the invention has the same structure as the first example shown in FIG. 1, however the fifth example differs from the first example the that the fifth example is configured to perform the control of in lamp power taking into account the time necessary for the lamp to reach a thermal equilibrium.

Generally, a discharge tube such as a metal-halide lamp is used as a light source (lamp) of a projection display apparatus. Since a discharge tube has an internal impedance which varies with its heat liberation, the lamp power fluctuates until it reaches a thermal equilibrium and stabilizes. The necessary time for the lamp to reach thermal equilibrium depends on environmental factors, such as temperature and the use of the projection display apparatus, for example, whether the lamp is lit up from a fully cooled state or lit up after a lapse of a short period of time after it was switched-off. Accordingly, the lamp power control circuit 4 does not perform the control of the lamp power on the basis of illuminance output from the photometer 1, but causes the lamp to illuminate at rated power over a period of time necessary for the lamp 5, which has been fully cooled to reach the thermal equilibrium. This period of time being a maximum length necessary for the lamp to enter a stable state in order to relieve stress on the lamp 5.

Although the fifth example starts the control of the lamp power after a lapse of a predetermined time regarding the lamp as having reached the thermal equilibrium, it is possible to monitor a voltage applied to the lamp 5 and a current flowing through the lamp and cause the lamp power control circuit 4 to start the power control after they are detected to have stabilized. It is also possible to monitor a temperature in the neighborhood of the lamp 5, and causes the lamp power control circuit 4 to start the power control after it is detected to have stabilized.

Figure 7:
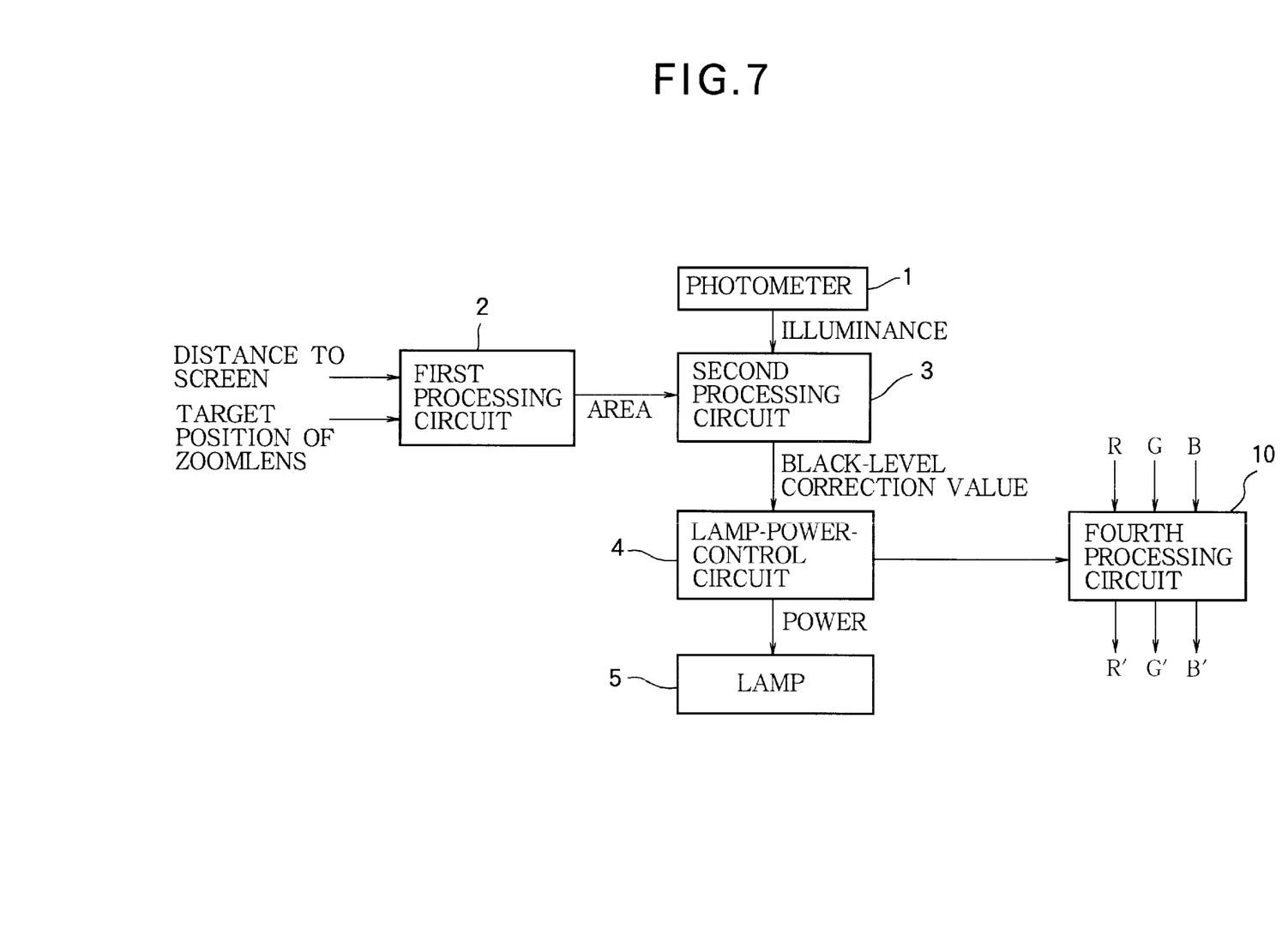
FIG. 7 is a block diagram showing a structure of a sixth example of the projection display apparatus according to the invention.

FIG. 7 is a block diagram showing a structure of a sixth example of the projection display apparatus according to the invention. In FIG. 7, the reference numerals identical to those in FIG. 1 represent the same or corresponding elements. The sixth example differs from the first example in that the sixth example has a fourth processing circuit 10.

The sixth example performs brightness adjustment and contrast adjustment on video signals by the fourth processing circuit 10 if the black-level subsidence occurs notwithstanding that the power supplied to the lamp 5 is increased up to a maximum as a result of the power control explained with reference to FIG. 1 when the projection display apparatus is used in a well-lit environment. This operation will be explained with reference to FIG. 8.

Figure 8:
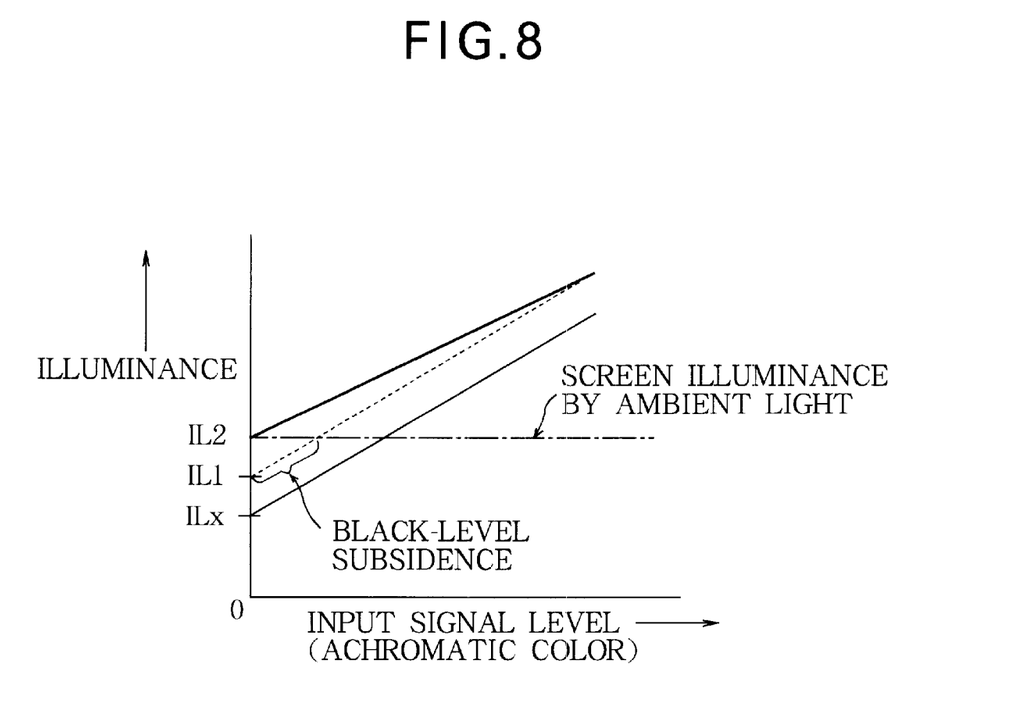
FIG. 8 is a view showing a relationship between illuminance of a projected image after correction and a level of an input signal in a case where brightness adjustment and contrast adjustment are performed additionally when illuminance due to the ambient light falling on the screen is high, and the black level correction through lamp power control is not sufficient.

FIG. 8 shows a relationship between a level of an input signal and illuminance of a projected image. In FIG. 8, the fine line represents the case of no power control being performed and the dotted line represents the case of the black level being raised up to a maximum value. When the illuminance of the screen due to the ambient light is IL2, even if the black level is raised up to maximum value, a part of the projected image having illuminance between IL2 and IL1 is not reproduced. The sixth example is configured to increase the brightness of the projected image such that the illuminance of the image when the input signal is at level 0, that is, the black level of the image becomes equal to IL2, and to correct the contrast in conformity with the increased black level.

The brightness adjustment and the contrast adjustment by the fourth processing circuit 10 will be explained below. A brightness BR corresponding to the difference between IL2 and IL1 shown in FIG. 8 is added to each of video signals R (red), G (green) and B (blue), and at the same time, the contrast is adjusted in order that the illuminance of the screen when the input video signal is at its maximum value remains unchanged. For example, in a case where R, G, B video signals are 8-bit (0 to 255) signals respectively, R', G', B' video signals after correction are calculated in accordance with the following expressions (14), (15) and (16) respectively. In consequence, a good image having an improved black level as shown by the bold line in FIG. 8 can be obtained.

$$R'=(255-BR)\cdot R/255+BR: BR<=255 \quad (14)$$

$$G'=(255-BR)\cdot G/255+BR: BR<=255 \quad (15)$$

$$B'=(255-BR)\cdot B/255+BR: BR<=255 \quad (16)$$

Figure 9:
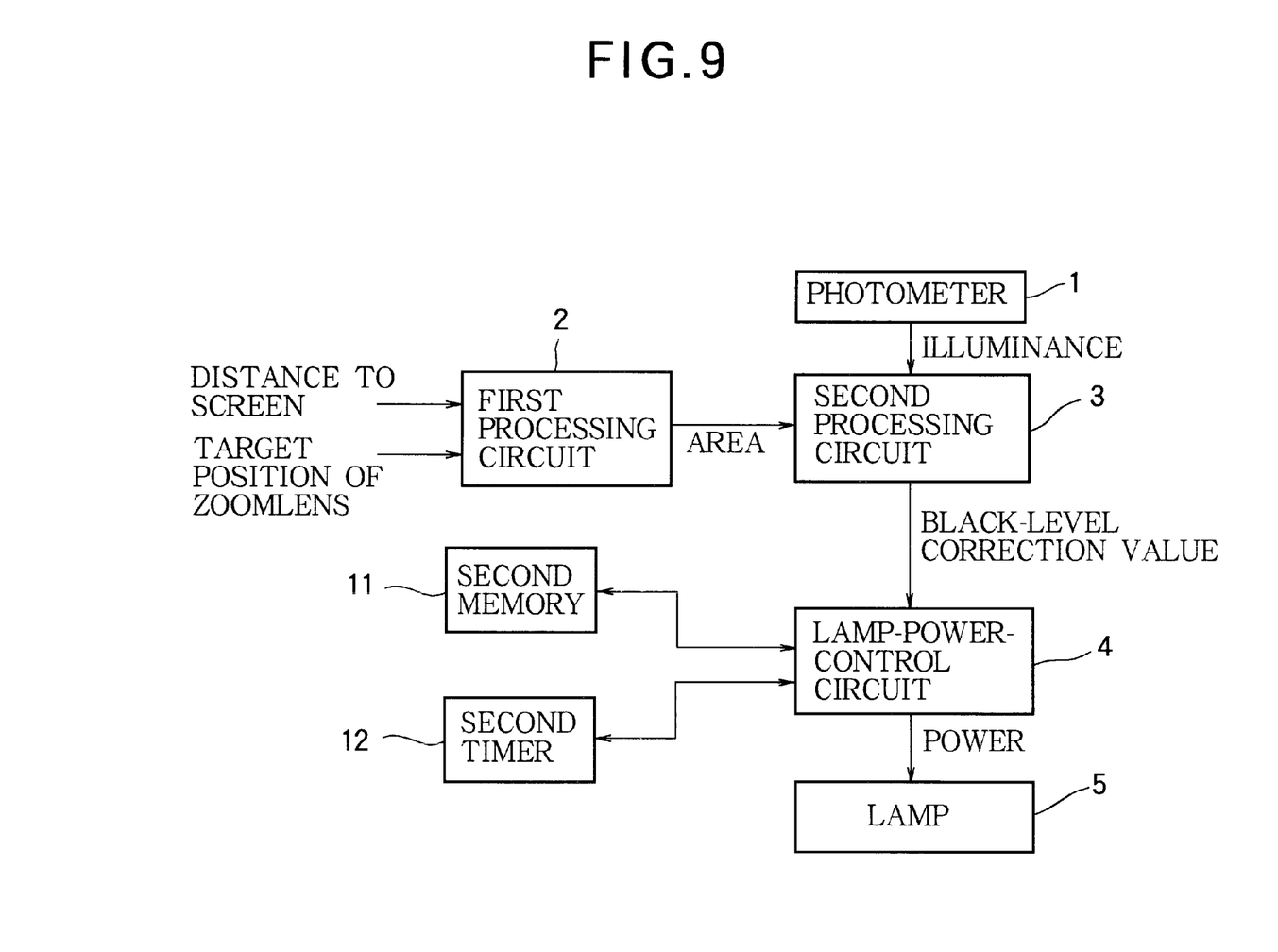
FIG. 9 is a block diagram showing a structure of a seventh example of the projection display apparatus according to the invention.

FIG. 9 is a block diagram showing a structure of a seventh example of the projection display apparatus according to the invention. In FIG. 9, the reference numerals identical to those in FIG. 1 represent the same or corresponding elements. The seventh example differs from the first example in that the seventh example has a second memory 11 and a second timer 12.

The second timer is a counter for measuring a cumulative lighting time of the lamp 5. The count value of the second timer 12 is reset to 0 when the lamp 5 is newly installed, or when the life of the lamp 5 has expired and it is replaced with a new one. The second memory 11 stores a tube voltage V(T) of the lamp 5 which varies with the cumulative lighting time T.

If the tube voltage of the newly installed lamp 5 is V(0) and the lamp current flowing through the lamp 5 when it is lighting stably is I, the set power Wset of the lamp 5 in a stably-lighting state is expressed by the following expression (17).

$$W\text{set}=V(0)\cdot I \quad (17)$$

The tube voltage V(T) varies with the cumulative lighting time (generally, the tube voltage increases as the cumulative lighting time increases). Accordingly, the seventh example controls the lamp power by the lamp power control circuit 4 in accordance with the following expression (18) to keep it at the set power Wset. Here, it is assumed that the lamp power control circuit 4 performs constant-current control for keeping the lamp current I constant.

$$W'=V(0)\cdot W/V(T) \quad (18)$$

In this expression (18), W is a lamp power when the variation of the tube voltage with the cumulative lighting time is not compensated. The lamp power control circuit 4 reads the tube voltage V(T) from the second memory 11 and makes the power W' after compensation equal to V(O)/V(T)·W by controlling the lamp current I.

The lamp power control circuit 4 performs the black-level correction in accordance with the following expressions (19), (20) and (21) to cope with the effect of the ambient light falling on the screen as explained with reference to FIG. 1.

$$Wr=W'+k\cdot BL\text{offset} \quad (19)$$

$$\text{If } Wr>W\text{max, then } Wr=W\text{max} \quad (20)$$

$$\text{If } Wr<W\text{min, then } Wr=W\text{min} \quad (21)$$

With the seventh example, it is possible to compensate for the variation of the lamp power caused by the tube voltage shift with the cumulative lighting time of the lamp 5.

Figure 10:
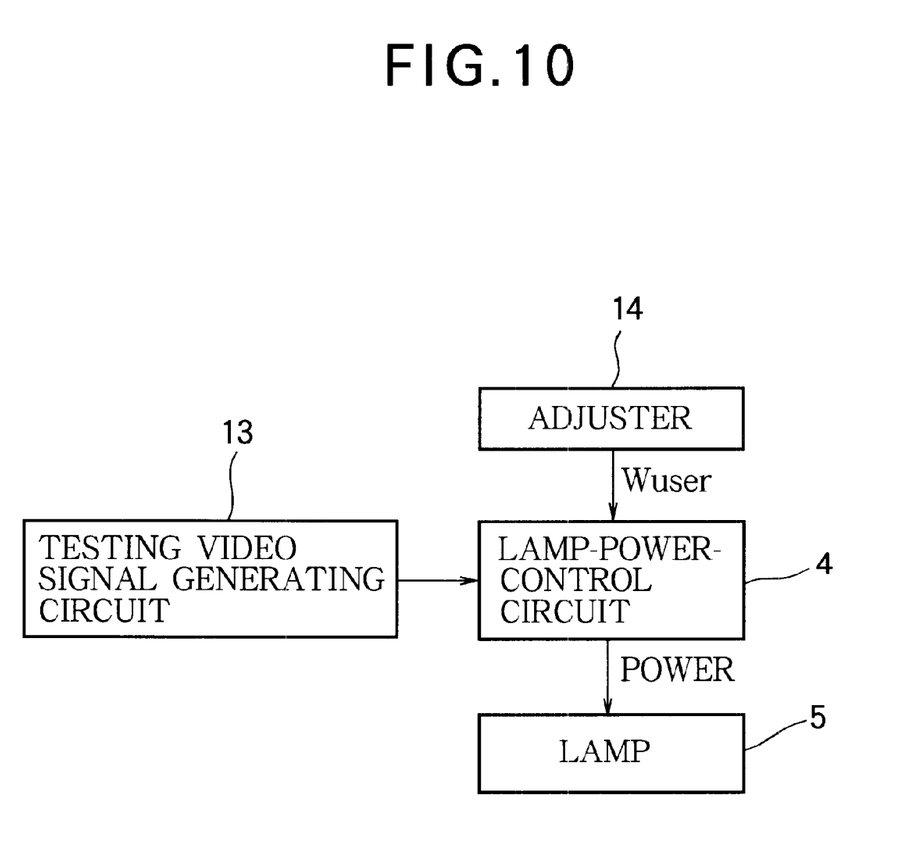
FIG. 10 is a block diagram showing a structure of an eighth example of the projection display apparatus according to the invention.

FIG. 10 is a block diagram showing a structure of an eighth example of the projection display apparatus according to the invention. In FIG. 10, the reference numerals identical to those in FIG. 1 represent the same or corresponding elements. The eighth example differs from the first example in that the eighth example has a testing video signal generating circuit 13 and an adjuster 14 instead of the first processing circuit 2 and the second processing circuit 3.

Figure 11:
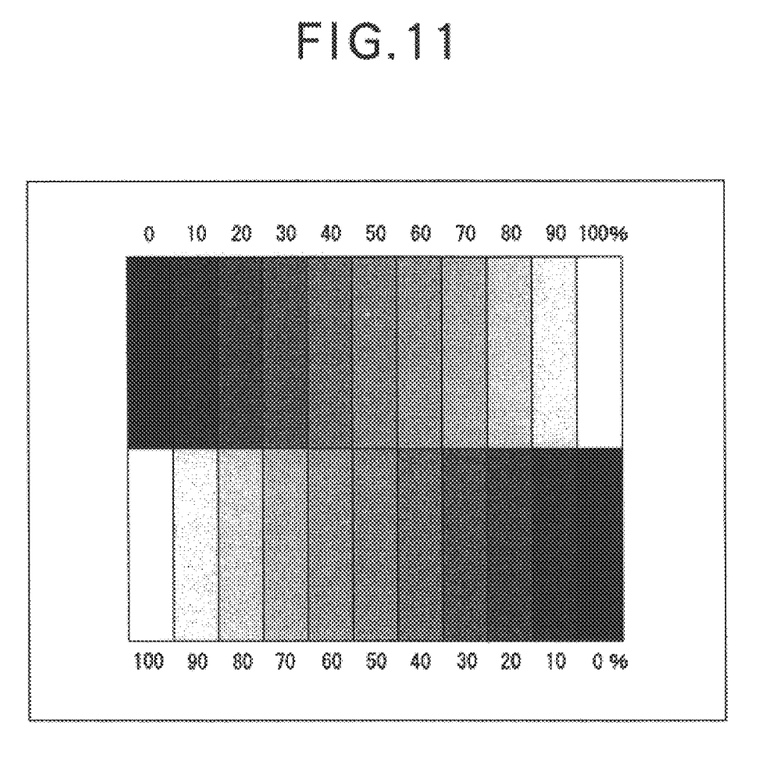
FIG. 11 is a view showing a test image generated from a testing video signal generating circuit.

With the signal output from the testing video signal generating circuit 13, it is possible to project, onto the screen, a monochrome test image such as the one whose lightness varies in a step-by-step manner as shown in FIG. 11. Accordingly the user can adjust a power-adjusting value Wuser, viewing the projected test image so as to remove any black-level rise or black-level subsidence.

The lamp power control circuit 4 controls the power supplied to the lamp 5 to Wr that is the sum of W and Wuser in accordance with the following expressions (22) to (24).

$$Wr=W+W\text{user} \quad (22)$$

$$\text{If } Wr>W\text{max, then } Wr=W\text{max} \quad (23)$$

$$\text{If } Wr<W\text{min, then } Wr=W\text{min} \quad (24)$$

With the eighth example, it is possible to reduce the circuit scale of the projection display apparatus compared with other examples.

The above explained preferred embodiments are exemplary of the invention of the present application which is described solely by the claims appended below. It should be understood that modifications of the preferred embodiments may be made as would occur to one of skill in the art.

What is claimed is:

1. A projection display apparatus in which a light emitted from a light source enters a light valve, an image corresponding to an input video signal is formed in an image-forming plane of the light valve, and the formed image is projected onto a screen through an optical system including a zoom lens, the projection display apparatus comprising:

a distance-measuring device automatically measuring a distance between the projection display apparatus and the screen;

a first processor for calculating an area of an image projected onto the screen on the basis of a target position of the zoom lens and the distance measured by the distance-measuring device;

a photometer for measuring illuminance in the neighborhood of the image projected onto the screen;

a second processor for calculating a black-level correction value from the area of the image calculated by the first processor and the illuminance measured by the photometer; and a light-source-power controller for controlling power supplied to the light source on the basis of the black-level correction value calculated by the second processor.

2. A projection display apparatus according to claim 1, further comprising a first timer which is reset when the power supplied to the light source is changed by the light-source-power controller and starts to measure a time elapsed after reset of the first timer, the light-source-power controller keeping the power supplied to the light source constant until a count value of the first timer reaches a predetermined value.

3. A projection display apparatus according to claim 1, further comprising a first memory which samples the illuminance measured by the photometer at regular time intervals and stores resultant samples in succession, and a third processor for calculating an average of the samples stored in the first memory, the second processor calculating the black-level correction value on the basis of the average of the samples supplied from the third processor.

4. A projection display apparatus according to claim 1, in which the light-source-power controller keeps the power supplied to the light source constant irrespective of the illuminance measured by the photometer until a predetermined time elapses after light up of the light source.

5. A projection display apparatus according to claim 1, further comprising a fourth processor which, when the illuminance in the neighborhood of the projected image measured by the photometer is higher than a maximum black level obtainable through control by the light-source-power controller, corrects an input video signal in order to adjust brightness and contrast of the projected image by a value corresponding to a difference between the illuminance in the neighborhood of the projected image and the maximum black level.

6. A projection display apparatus according to claim 1, in which the light source includes a discharge tube whose tube voltage varies with increase of a cumulative lighting time thereof, the projection display apparatus further comprising a second timer for measuring the cumulative lighting time of the light source, and a second memory storing a characteristic of variation of the tube voltage with the increase of the cumulative lighting time of the light source, the light-source-power controller compensating for variation of the power supplied to the light source due to the variation of the tube voltage on the basis of the cumulative lighting time supplied from the second timer and the characteristic of the variation of the tube voltage supplied from the second memory.

7. A method for controlling a black level value in a projection display apparatus, wherein light emitted from a light source enters a light valve in the projection display apparatus and an image corresponding to an input video signal is formed and projected onto a screen through an optical system, the method steps comprising:

automatically measuring a distance between the projection display apparatus and the screen;

calculating an area of an image projected onto the screen by a first processor on the basis of a target position of the zoom lens and the distance measured by the distance-measuring device;

measuring illuminance, with a photometer, in the neighborhood of the image projected onto the screen;

calculating, with a second processor, a black-level correction value from the area of the image calculated by the first processor and the illuminance measured by the photometer; and controlling power supply to the light source, by a light-source-power controller, on the basis of the black-level correction value calculated by the second processor.

* * * * *